(12) United States Patent  
Hirose

(10) Patent No.: US 9,228,629 B2
(45) Date of Patent: Jan. 5, 2016

(54) SHOCK ABSORBING MEMBER

(75) Inventor: Satoshi Hirose, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 0 days.

(21) Appl. No.: 14/237,743

(22) PCT Filed: Aug. 7, 2012

(86) PCT No.: PCT/JP2012/070092
§ 371 (c)(1),
(2), (4) Date: Feb. 7, 2014

(87) PCT Pub. No.: WO2013/021996
PCT Pub. Date: Feb. 14, 2013

(65) Prior Publication Data
US 2014/0174867 A1 Jun. 26, 2014

(30) Foreign Application Priority Data
Aug. 9, 2011 (JP) .................. 2011-174201

(51) Int. Cl.
*F16F 7/12* (2006.01)
*B62D 21/15* (2006.01)

(52) U.S. Cl.
CPC .............. *F16F 7/123* (2013.01); *B62D 21/15* (2013.01); *B62D 21/152* (2013.01); *F16F 7/12* (2013.01)

(58) Field of Classification Search
CPC ............ F16F 7/12; F16F 7/123; B62D 21/15; B62D 21/152; B60R 19/34
See application file for complete search history.

(56) References Cited

U.S. PATENT DOCUMENTS

| 4,702,515 A | 10/1987 | Kato et al. |
| 2008/0012386 A1 | 1/2008 | Kano et al. |
| 2010/0072788 A1* | 3/2010 | Tyan et al. ............... 296/205 |
| 2011/0006560 A1 | 1/2011 | Honda et al. |
| 2011/0015902 A1* | 1/2011 | Cheng et al. ............... 703/1 |
| 2013/0221692 A1* | 8/2013 | Wang et al. ............... 293/132 |

FOREIGN PATENT DOCUMENTS

| EP | 1477371 A2 * | 11/2004 | ........... B60R 19/34 |
| EP | 2 055 983 A2 | 5/2009 | |
| JP | 9-277953 A | 10/1997 | |

(Continued)

OTHER PUBLICATIONS

International Search Report issued in PCT/JP2012/070092, mailed on Nov. 20, 2012.

*Primary Examiner* — Robert A Siconolfi
*Assistant Examiner* — Charles Poon
(74) *Attorney, Agent, or Firm* — Birch, Stewart, Kolasch & Birch, LLP

(57) ABSTRACT

A hollow columnar shock absorbing member (1) has an axis (O), a plurality of rectangular walls (1a, 1b, 1c, 1d) extending parallel to axis (O), and a polygonal cross-section perpendicular to axis (O), the shock absorbing member extending in the direction of axis (O) and absorbing externally-applied impact energy while buckling in the direction of axis (O). Shock absorbing member (1) is provided with at least two flanges (2a, 2b, 2c, 2d) protruding from at least two edges (1e, 1f, 1g, 1h) formed by at least two sets of neighboring walls among a plurality of walls, and the at least two flanges are arranged so that the directions of protrusion of the flanges from the edges are directed to the same direction with respect to a circumferential direction.

10 Claims, 26 Drawing Sheets

(56) References Cited

FOREIGN PATENT DOCUMENTS

| | | |
|---|---|---|
| JP | 9-277954 A | 10/1997 |
| JP | 10-138950 A | 5/1998 |
| JP | 2005-001462 A | 1/2005 |
| JP | 2005-153567 A | 6/2005 |
| JP | 2005-170082 A | 6/2005 |
| JP | 2005-225394 A | 8/2005 |
| JP | 2005-247166 A | 9/2005 |
| JP | 2006-207724 A | 8/2006 |
| JP | 2006-207726 A | 8/2006 |
| JP | 2007-030725 A | 2/2007 |
| JP | 2008-018792 A | 1/2008 |
| JP | 2009-113596 A | 5/2009 |
| JP | 2009-113675 A | 5/2009 |
| JP | 2009-154587 A | 7/2009 |
| JP | 2009-168115 A | 7/2009 |
| JP | 2009-285668 A | 12/2009 |
| JP | 2009-286221 A | 12/2009 |
| JP | 2010-126067 A | 6/2010 |
| JP | 2011-016411 A | 1/2011 |
| JP | 2011-056997 A | 3/2011 |
| WO | WO 2011030453 A1 * | 3/2011 |

* cited by examiner $(\beta < \alpha = 180°)$

Fig.7B
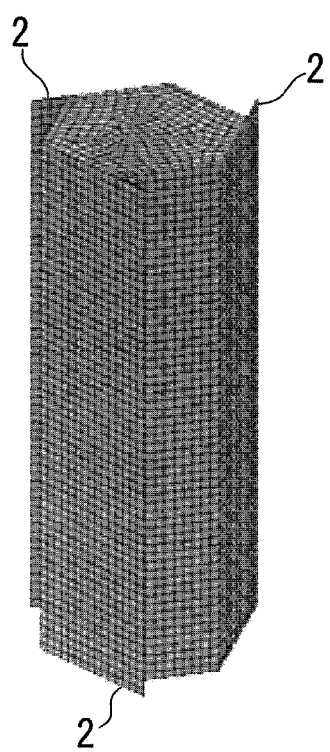
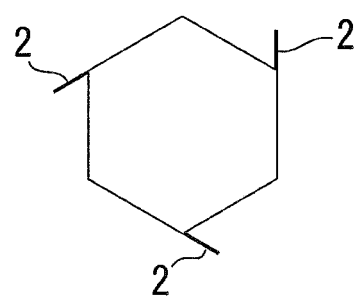

Fig.7C
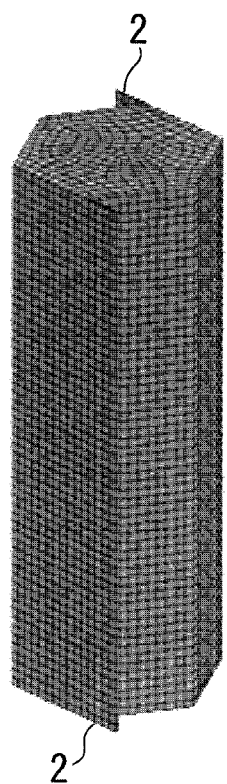
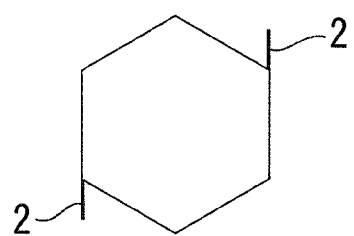

Fig.8A
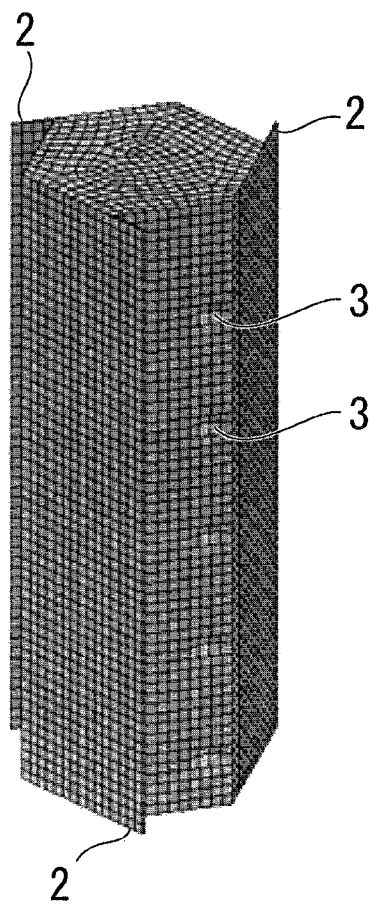
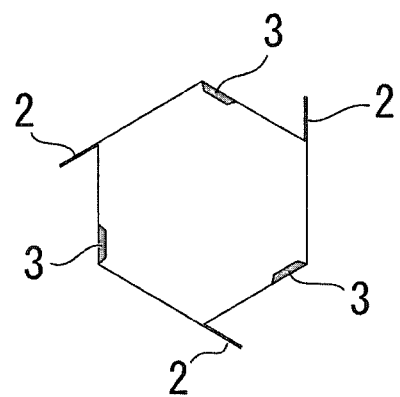

Fig.8B
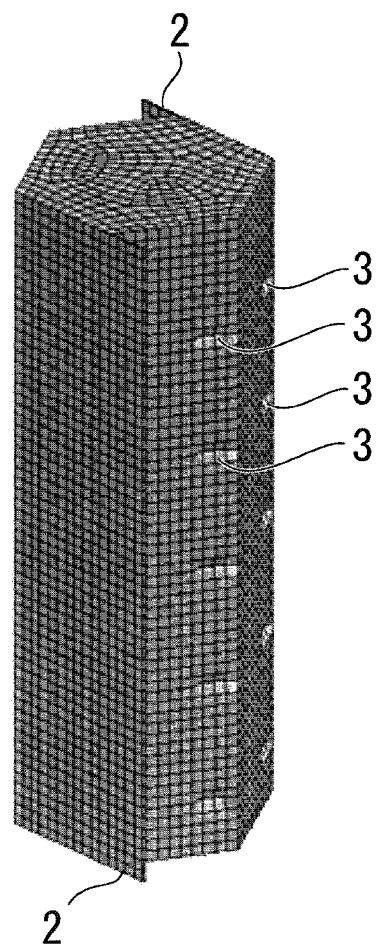
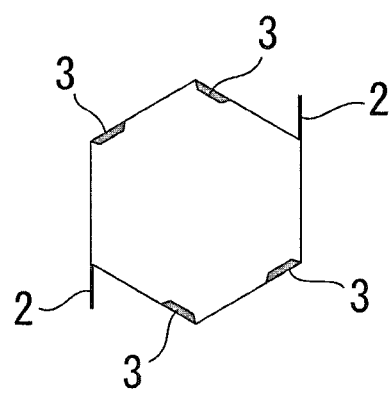

Fig.9A
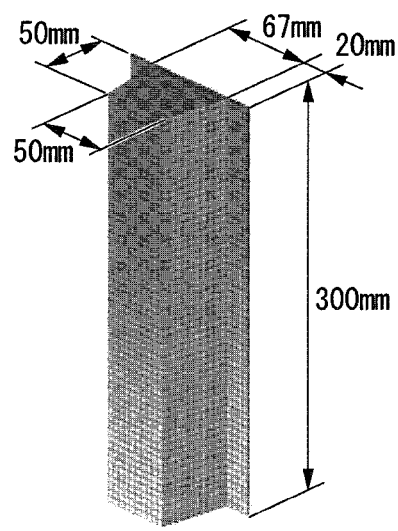
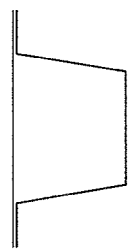

Fig.9B
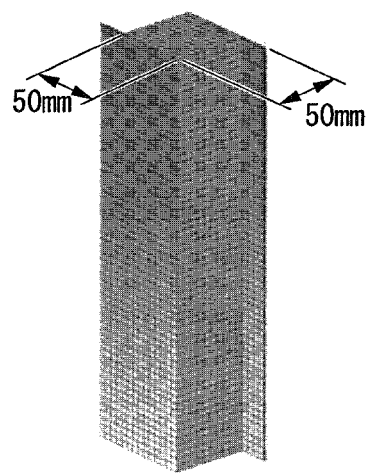
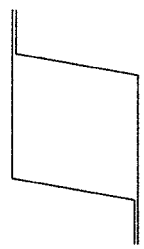

Fig.9C
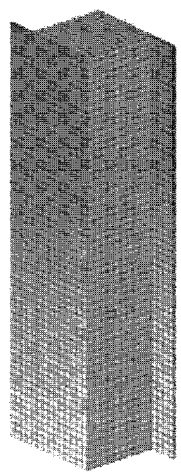
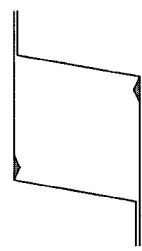

Fig.9D
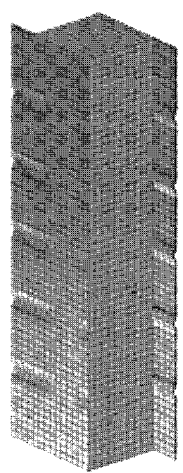
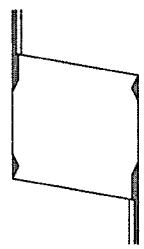

Fig.9E
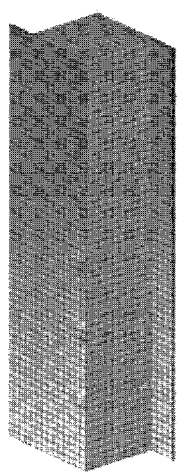
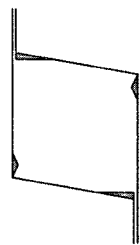

SHOCK ABSORBING MEMBER

TECHNICAL FIELD

The present invention relates to a shock absorbing member which absorbs externally-applied impact energy while buckling.

BACKGROUND ART

In recent years, in the automotive field, etc., improvement in fuel efficiency and motion performance have been sought, while improvement in collision safety has also been sought. As a chassis of a motorcar, in order to balance reduced weight and high stiffness, a chassis structure referred to as a "monocoque body," wherein a frame and a body are integrally formed, is generally used. Further, in the chassis of a motorcar, in order to maintain a survival space for a driver and a passenger in a collision, a shock absorbing structure is generally used, wherein a space (for example, an engine room or a luggage room) other than a cabin is preferentially collapsed, so that impact load applied to the cabin is attenuated as much as possible and the deformation of the cabin is minimized.

Therefore, in order to constitute a chassis structure with high collision-safety performance, it is important to effectively absorb the impact energy at the time of collision. To this end, a shock absorbing member for effectively absorbing the impact energy at the time of collision has been strenuously developed (for example, see Patent Literatures 1 to 15).

Generally, as a shock absorbing member, a hollow columnar thin-walled structure (or a hollow columnar member) manufactured by jointing press-formed steel plates by welding, etc., is used. In order to balance reduced weight and high stiffness, as described above, the shock absorbing member is constituted by a hollow member having a polygonal cross-section such as a tetragon or a hexagon. Such a shock absorbing member is used as a front-side member of a chassis, for example, and absorbs the impact energy by buckling in an axial direction (or axial crushing) when impact load is applied to one end of the member at the time of collision. Therefore, in order to improve the shock-absorbing performance, it is important to effectively generate such buckling and increase the buckling load thereof.

In the prior art, in order to solve the above problems in terms of material, a relatively thick or relatively high-strength steel plate is used to manufacture a shock absorbing plate so as to increase the buckling load. On the other hand, as a structural measure, a dimple (or a bead) providing the origin of the buckling is arranged so as to effectively generate the buckling. Further, by forming a cross-section of the hollow shock absorbing member as a polygonal shape, the buckling load is increased.

However, when the plate thickness of the above shock absorbing member is increased, the weight of the member is increased, whereby the weight of a chassis including the shock absorbing member is also increased. As a result, fuel efficiency and driving performance of a motorcar are deteriorated. Further, in a high-strength steel plate, the degree of elongation is generally decreased in inverse proportion to the strength thereof. Therefore, the formability of a high-strength steel plate is not good, and thus there are limitations to increasing the strength of a steel plate for the shock absorbing member at present.

Incidentally, when the buckling load of the shock absorbing member is solely increased, a minimum impact load for generating the buckling is increased. In this case, the impact load applied to the shock absorbing member is not absorbed by the deformation of the shock absorbing member, whereby the impact load with no change is transmitted to another structure such as a cabin. Further, a risk of injury to driver and a passenger is increased, since a portion which is not to be deformed is buckled; it is difficult to keep a survival space for the drive and the passenger due to the deformation of the cabin; or a significant change of acceleration is applied to the driver and the passenger.

Therefore, for example, the shock absorbing member is configured as a straight member in order to keep the cross-section from a start end of the buckling constant as much as possible, and secure a certain amount of deformation due to the buckling. Further, in order to reduce an initial impact load applied to the shock absorbing member, the shock absorbing member is stably buckled into concertinas due to an arrangement of the beads as described above.

However, there is no firm theory for determining the above arrangement of the beads, and at present, the arrangement is determined by repeatedly buckling test or a computer simulation regarding the shock absorbing member. Accordingly, it is necessary to repeatedly carry out the above test or simulation in relation to each kind of chassis, whereby design efficiency is deteriorated. Moreover, since various load conditions or buckling modes predicted when actual collision cannot be dealt with, it is very difficult to optimize the arrangement of the beads by using the above techniques.

CITATION LIST

Patent Literature

PLT 1: Japanese Unexamined Patent Publication (kokai) No. 2009-286221
PLT 2: Japanese Unexamined Patent Publication (kokai) No. 2009-285668
PLT 3: Japanese Unexamined Patent Publication (kokai) No. 2009-168115
PLT 4: Japanese Unexamined Patent Publication (kokai) No. 2009-154587
PLT 5: Japanese Unexamined Patent Publication (kokai) No. 2009-113596
PLT 6: Japanese Unexamined Patent Publication (kokai) No. 2008-018792
PLT 7: Japanese Unexamined Patent Publication (kokai) No. 2007-030725
PLT 8: Japanese Unexamined Patent Publication (kokai) No. 2006-207726
PLT 9: Japanese Unexamined Patent Publication (kokai) No. 2006-207724
PLT 10: Japanese Unexamined Patent Publication (kokai) No. 2005-225394
PLT 11: Japanese Unexamined Patent Publication (kokai) No. 2005-153567
PLT 12: Japanese Unexamined Patent Publication (kokai) No. 2005-001462
PLT 13: Japanese Unexamined Patent Publication (kokai) No. H10-138950
PLT 14: Japanese Unexamined Patent Publication (kokai) No. H09-277954
PLT 15: Japanese Unexamined Patent Publication (kokai) No. H09-277953
PLT 16: Japanese Unexamined Patent Publication (kokai) No. 2011-056997

SUMMARY OF INVENTION

Problem to be Solved by the Invention

Incidentally, in buckling modes (or compact-modes) wherein the above shock absorbing member is buckled into concertinas, a "concave-convex mixed mode" and a "concave-convex independent mode" are included. The concave-convex mixed mode is a deformation mode wherein both a concave portion and a convex portion of concertinas are present in an arbitrary transverse cross-section of a hollow columnar shock absorbing member which is buckled into concertinas by impact load. On the other hand, the concave-convex independent mode is a deformation mode wherein only a concave portion or a convex portion is present in the arbitrary transverse cross-section. In this regard, a ratio of a deformed portion to the entire member in the concave-convex independent mode is larger than that in the concave-convex mixed mode. Therefore, in the concave-convex independent mode, an amount of impact energy absorption relative to an amount of deformation (or an amount of crushing) is relatively high, and thus improved shock-absorbing performance can be obtained.

In a conventional shock absorbing member, various approaches have been made for increasing the amount of impact energy absorption while buckling the member into concertinas in the axial direction. However, there has been no approach for purposely induce the above concave-convex independent mode. In other words, in the compact mode of the conventional shock absorbing member, the concave-convex mixed mode is a major mode, and a mechanism for generating the concave-convex independent mode has not been found.

The present invention was made in view of the above background, and an object of the invention is to provide a shock absorbing member having improved shock-absorbing performance, in particular, a shock absorbing member capable of purposely inducing the concave-convex independent mode.

Means for Solving the Problem

In order to solve the above problems, the present invention provides a hollow columnar shock absorbing member having an axis (O), a plurality of rectangular walls extending parallel to the axis, and a polygonal cross-section perpendicular to the axis, the shock absorbing member extending in the direction of the axis and absorbing externally-applied impact energy while buckling in a direction of the axis, wherein the shock absorbing member is provided with at least two flanges protruding from at least two edges formed by at least two sets of neighboring walls among a plurality of walls, and the at least two flanges are arranged so that directions of protrusion of the flanges from the edges are directed to the same direction with respect to a circumferential direction.

The shock absorbing member may be provided with a bead on at least one of the walls. The bead may be a dimple which dents from an outer surface of the shock absorbing member or a bulge which bulges from the outer surface. It is preferable that the dimple be positioned so as to be deviated towards the edge positioned on a side opposite to the direction of protrusion of the flange with respect to the circumferential direction, and the bulge be positioned so as to be deviated towards the edge positioned on a side in the direction of protrusion of the flange with respect to the circumferential direction.

Further, the concave-convex independent mode can be purposely induced by forming a buckling inducing portion for determining a direction of inclination formed on the wall and/or the edge of the shock absorbing member, so that a ridge of each edge is inclined in the same direction with respect to a circumferential direction of the shock absorbing member at the beginning of the buckling, when the shock absorbing member is buckled in the direction of the axis.

Effects of Invention

According to the present invention, a shock absorbing member having improved shock-absorbing performance can be provided, in particular, the shock absorbing member can be effectively buckled in the direction of the axis by purposely inducing the concave-convex independent mode. As a result, the amount of externally-applied impact energy absorption is increased, and improved shock-absorbing performance can be obtained.

BRIEF DESCRIPTION OF DRAWINGS

FIG. 7B is a perspective view of a shock absorbing member according to one embodiment of the invention.

FIG. 7C is a perspective view of a shock absorbing member according to one embodiment of the invention.

FIG. 8A is a perspective view of a shock absorbing member according to one embodiment of the invention.

FIG. 8B is a perspective view of a shock absorbing member according to one embodiment of the invention.

FIG. 9A is a perspective view of a shock absorbing member of comparative example 1, showing a state before impact load is applied thereto.

FIG. 9B is a perspective view of a shock absorbing member of working example 1, showing a state before impact load is applied thereto.

FIG. 9C is a perspective view of a shock absorbing member of working example 2, showing a state before impact load is applied thereto.

FIG. 9D is a perspective view of a shock absorbing member of working example 3, showing a state before impact load is applied thereto.

FIG. 9E is a perspective view of a shock absorbing member of working example 4, showing a state before impact load is applied thereto.

EMBODIMENTS FOR CARRYING OUT THE INVENTION

Hereinafter, a shock absorbing member according to the present invention will be explained in detail with reference to the drawings.

A hollow columnar shock absorbing member of the invention has an axis, a plurality of rectangular walls extending parallel to the axis, and a polygonal cross-section perpendicular to the axis, the shock absorbing member extending in the direction of the axis and absorbing externally-applied impact energy while buckling in a direction of the axis. At least two flanges protrude from at least two edges formed by at least two sets of neighboring walls among the plurality of walls, and the at least two flanges are arranged so that directions of protrusion of the flanges from the edges are directed to the same direction with respect to a circumferential direction.

Further, in the shock absorbing member, a bead may be formed on at least one of the walls. The bead may be a dimple which dents from an outer surface of the shock absorbing member or a bulge which bulges from the outer surface. It is preferable that the dimple be positioned so as to be deviated towards the edge positioned on a side opposite to the direction of protrusion of the flange with respect to the circumferential direction, and the bulge be positioned so as to be deviated towards the edge positioned on a side in the direction of protrusion of the flange with respect to the circumferential direction.

Hereinafter, a shock absorbing member according to the present invention will be explained in detail with reference to the drawings.

In FIGS. 1A to 10, various deformation modes are illustrated, which are generated when impact load is applied to one end of a hollow linear columnar shock absorbing member in a direction of an axis thereof (or an axial direction), the shock absorbing member having a square cross-section. The deformation modes as shown in FIGS. 1A to 1D are calculated by FEM (Finite Element Method) numerical analysis (or computer simulation) when the shock absorbing member is deformed by applied impact load.

Figure 1A:
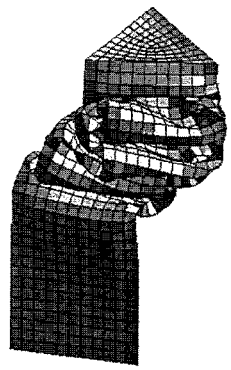
FIG. 1A is a perspective view of a hollow columnar member having a square hollow cross-section, wherein deformation of the member when impact load is applied to one end thereof in an axial direction is calculated by FEM numerical analysis, the view showing a state in which the member is bent by local buckling.
Figure 1B:
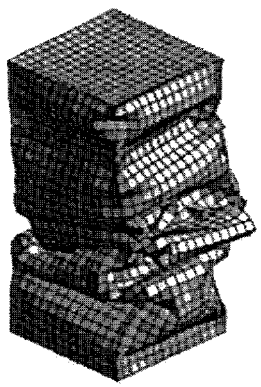
FIG. 1B is a perspective view of a hollow columnar member similar to FIG. 1A, wherein deformation of the member is calculated by FEM numerical analysis, the view showing a non-compact mode in which the member is irregularly buckled in the axial direction.
Figure 1C:
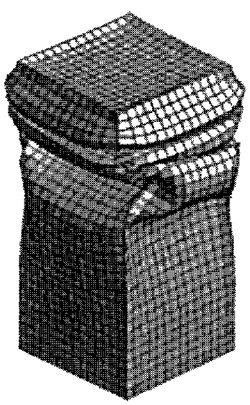
FIG. 1C is a perspective view of a hollow columnar member similar to FIG. 1A, wherein deformation of the member is calculated by FEM numerical analysis, the view showing a concave-convex mixed mode among compact modes in which the member is buckled into concertinas in the axial direction.
Figure 1D:
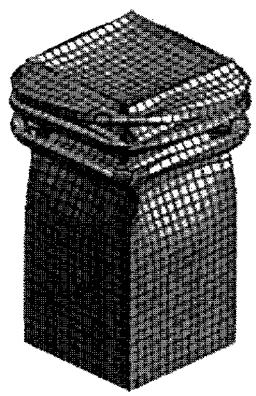
FIG. 1D is a perspective view of a hollow columnar member similar to FIG. 1A, wherein deformation of the member is calculated by FEM numerical analysis, the view showing a concave-convex independent mode among the compact modes in which the member is buckled into concertinas in the axial direction.
Figure 2A:
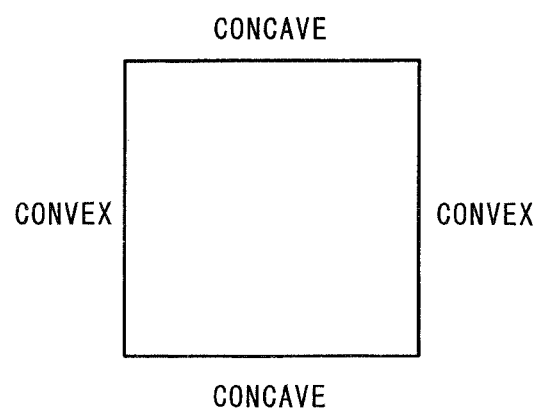
FIG. 2A is a schematic view for exemplifying an arbitrary transverse cross-section perpendicular to an axis of the hollow columnar member in the concave-convex mixed mode.
Figure 2B:
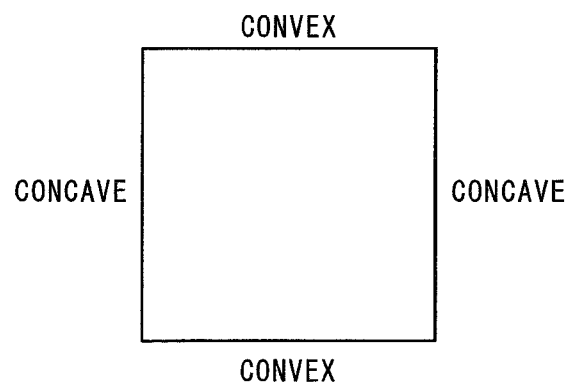
FIG. 2B is a schematic view for exemplifying a transverse cross-section, other than the cross-section of FIG. 2A, perpendicular to the axis of the hollow columnar member in the concave-convex mixed mode.
Figure 3A:
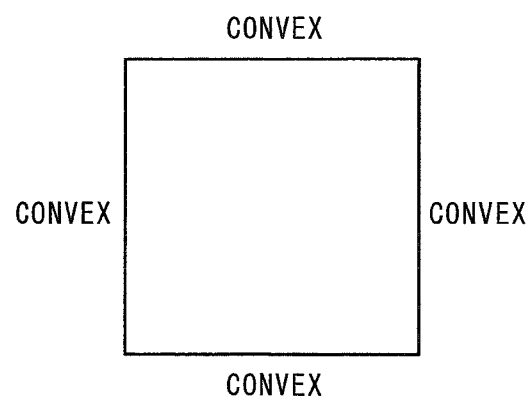
FIG. 3A is a schematic view for exemplifying an arbitrary transverse cross-section perpendicular to the axis of the hollow columnar member in the concave-convex independent mode.
Figure 3B:
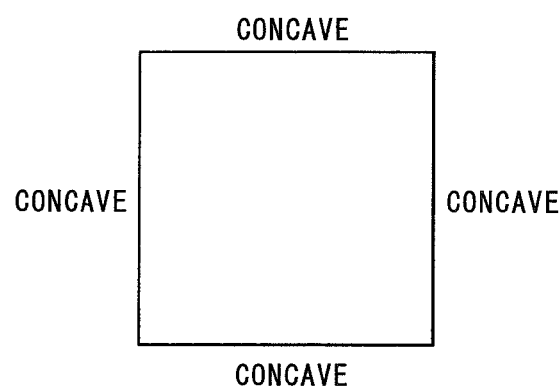
FIG. 3B is a schematic view for exemplifying a transverse cross-section, other than the cross-section of FIG. 3A, perpendicular to the axis of the hollow columnar member in the concave-convex independent mode.

FIG. 1A shows a state wherein the shock absorbing member is bent by local buckling. On the other hand, FIG. 1B shows a non-compact mode wherein the shock absorbing member is irregularly buckled in the axial direction. FIGS. 1C and 1D show modes wherein the shock absorbing member is buckled into concertinas in the axial direction. In other words, FIGS. 1C and 1D shows compact modes wherein the member is crushed so that a peak and a valley are alternately formed in the axial direction. In particular, FIG. 1C shows a concave-convex mixed mode of the compact modes. In the concave-convex mixed mode, both the valley (or a concave portion) and the peak (or a convex potion) of the concertinas are included in an arbitrary transverse cross-section of a hollow columnar member, as schematically shown in FIGS. 2A and 2B. To the contrary, FIG. 1D shows a concave-convex independent mode of the compact modes. In the concave-convex independent mode, only the valley (or a concave portion) or the peak (or a convex potion) of the concertinas is included in an arbitrary transverse cross-section of a hollow columnar member, as schematically shown in FIGS. 3A and 3B. In addition, the "concave-convex independent mode" and the "concave-convex mixed mode" may also be referred to as an "extension mode" and an "inextension mode," respectively.

In such a case, a ratio of a deformed portion to the entire member is increased as the deformation mode is shifted from FIG. 1A to FIG. 1D. Therefore, in the concave-convex independent mode as shown in FIG. 1D, an amount of impact energy absorption relative to an amount of deformation (crushing) of the member is the highest. In other words, in the concave-convex independent mode, the member can be buckled in the axial direction most effectively, whereby significantly high impact-absorbing performance can be obtained.

As described above, in the present invention, the flanges are formed on at least two edges, and the flanges are arranged so that directions of protrusion of the flanges from the edges are directed to the same direction with respect to a circumferential direction. By virtue of this, the concave-convex independent mode can be purposely induced.

Figure 4A:
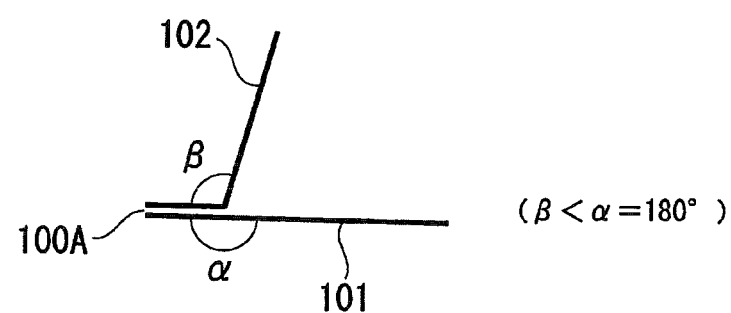
FIG. 4A is a schematic cross-sectional view for explaining a protruding direction of a flange, wherein the flange extends along one wall.
Figure 4B:
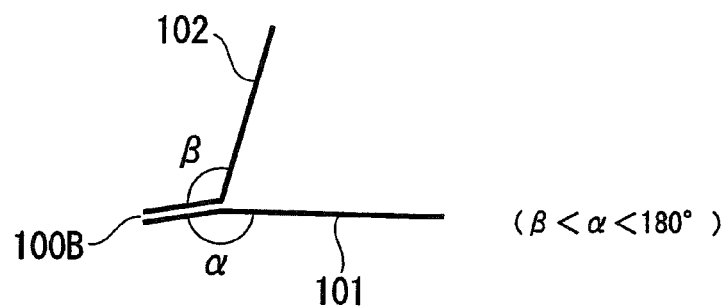
FIG. 4B is a schematic cross-sectional view for explaining a protruding direction of a flange, wherein the flange is formed by bending walls by different angles.

In this regard, "the direction of protrusion of the flange" means a direction towards one of two walls constituting the flange having a smaller open angle. For example, FIG. 4A schematically shows a flange 100A constituted by walls 101 and 102, wherein an angle β between wall 102 and flange 100A is smaller than an angle α between wall 101 and flange 100A (β<α). Therefore, the direction towards wall 102 is determined as the direction of protrusion of flange 100A with respect to the circumferential direction of the shock absorbing member.

Although flange 100A extends along wall 101 in FIG. 4A (β<α=180°), the flange is not limited as such. For example, in a flange 100B schematically shown in FIG. 4B, walls 101 and 102 may be bent by different angles so as to constitute flange 100B (β<α<180°). Otherwise, a flange (not shown) wherein (β<180°<α) is true may be constituted.

Figure 5A:
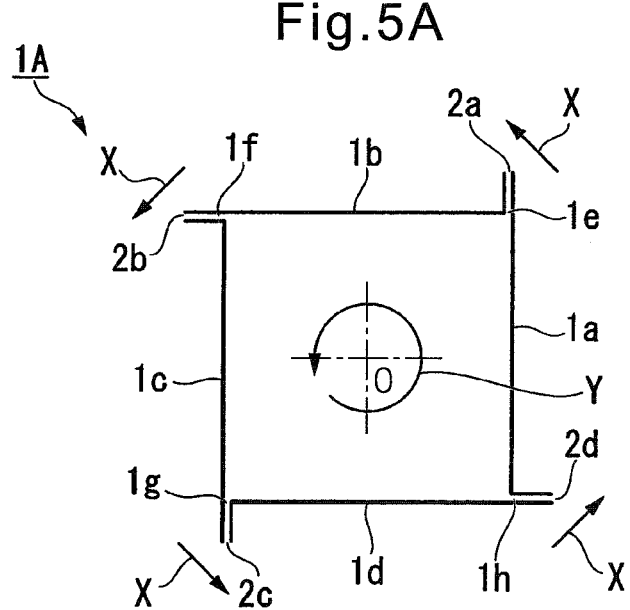
FIG. 5A is a schematic cross-sectional view for explaining the buckling of a shock absorbing member according to one embodiment of the invention.

As exemplified in FIG. 5A, a shock absorbing member 1A, constituted by a hollow member with a square cross-section, has a center axis O, four walls 1a, 1b, 1c and 1d positioned around center axis O. By joining walls 1a, 1b, 1c and 1d to each other, four edges or corners 1e, 1f, 1g and 1h and flanges 2a, 2b, 2c and 2d on respective edges are formed. Flanges 2a, 2b, 2c and 2d are arranged so that a direction (X) of protrusion of each of flanges 2a, 2b, 2c and 2d from respective corners 1e, 1f, 1g and 1h is directed to the same direction (Y) with respect to the circumferential direction about axis O.

In this case, by applying impact load to one end of shock absorbing member 1A in a direction of the axis (or the axial direction), the shock absorbing member begins to be buckled while a ridge of each corner 1e, 1f, 1g and 1h is inclined in the same direction Y with respect to the circumferential direction about axis O, i.e., in the direction X towards walls 1b, 1c, 1d and 1a, respectively, wherein the open angle at each flange is smaller. By virtue of this, the above concave-convex independent mode can be purposely induced.

Figure 5B:
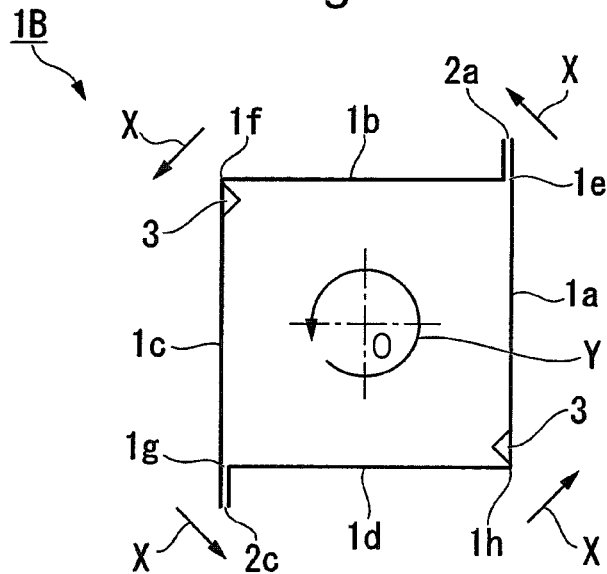
FIG. 5B is a schematic cross-sectional view for explaining the buckling of a shock absorbing member according to another embodiment of the invention.

FIG. 5B schematically shows a shock absorbing member 1B with a square cross-section, wherein a panel constituted by walls 1a and 1d and another panel constituted by walls 1b and 1c are joined at a site between walls 1a and 1b and at a site between walls 1c and 1d so that flanges 2a and 2c are formed so as to protrude from two corners 1e and 1g, respectively. In this case, flanges 2a and 2c are arranged so that a direction (X) of protrusion of each of flanges 2a and 2c from respective corners 1e and 1g is directed to the same direction (Y) with respect to the circumferential direction about axis O.

Further, on walls 1a and 1c, each wall being one of the neighboring walls sandwiching corners 1f and 1h different from corners 1e and 1g on which flanges 2a and 2c are formed, dimples 3 denting from outer surfaces of walls 1a and 1c may be formed. In this case, dimples 3 are positioned so as to be deviated, in relation to centers of walls 1a and 1c, respectively, towards corners 1f and 1h which are positioned on the side opposite to protruding direction X of flanges 2a and 2c with respect to the circumferential direction about axis O.

In this case, by applying impact load to one end of shock absorbing member 1B in a direction of the axis (or the axial direction), the shock absorbing member begins to be buckled while ridges of corners 1e and 1g are inclined in the same direction Y with respect to the circumferential direction about axis O, i.e., in the direction X towards walls 1b and 1d, respectively, wherein the open angle at each flange is smaller. Further, ridges of corners 1f and 1h are inclined in the same direction Y with respect to the circumferential direction about axis O, i.e., towards the side where dimples 3 are formed (in the direction X). By virtue of this, the above concave-convex independent mode can be purposely induced.

Figure 5C:
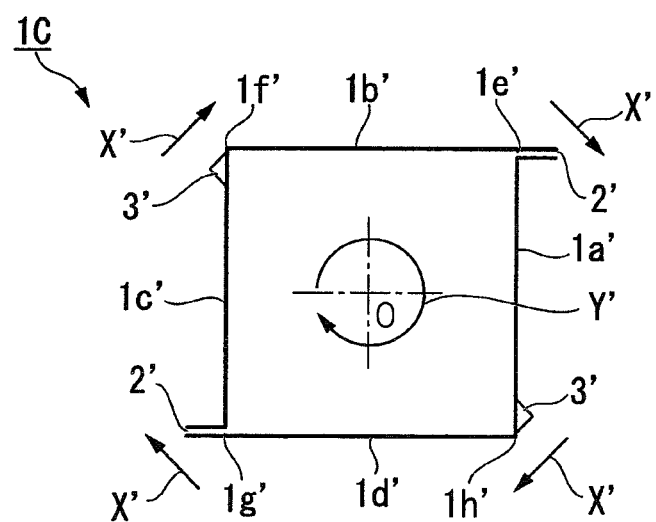
FIG. 5C is a schematic cross-sectional view for explaining the buckling of a shock absorbing member according to still another embodiment of the invention.

FIG. 5C schematically shows a shock absorbing member 1C with a square cross-section, wherein a panel constituted by walls 1a' and 1d' and another panel constituted by walls 1b' and 1c' are joined at a site between walls 1a' and 1b' and at a site between walls 1c' and 1d' so that flanges 2' are formed so as to protrude from two corners 1e' and 1g', respectively. In this case, flanges 2' are arranged so that a direction (X') of protrusion of each of flanges 2' from respective corners 1e' and 1g' is directed to the same direction (Y') with respect to the circumferential direction about axis O.

Further, on walls 1a' and 1c', each wall being one of the neighboring walls sandwiching corners 1f' and 1h' different from corners 1e' and 1g' on which flanges 2' are formed, bulges 3' bulging from outer surfaces of walls 1a' and 1c' may be formed. In this case, bulges 3' are positioned so as to be deviated, in relation to centers of walls 1a' and 1c', respectively, towards corners 1f' and 1h' which are positioned on the side in protruding direction X' of flanges 2' with respect to the circumferential direction about axis O.

In this case, by applying impact load to one end of shock absorbing member 1C in a direction of the axis (or the axial direction), the shock absorbing member begins to be buckled while ridges of corners 1e' and 1g' are inclined in the same direction Y' with respect to the circumferential direction about axis O, i.e., in the direction X' towards walls 1b' and 1d', respectively, wherein the open angle at each flange is smaller.

Further, ridges of corners 1*f* and 1*h*' are inclined in the same direction Y' with respect to the circumferential direction about axis O, i.e., towards a side opposite to the side where bulges 3' are formed (in the direction X'). By virtue of this, the above concave-convex independent mode can be purposely induced.

In another shock absorbing member to which the present invention is applied, the flange is formed on one corner, and the dimple denting from the outer surface or the bulge bulging from the outer surface is formed on at least one of the walls of the shock absorbing member. When the dimple is formed, the dimple is positioned so as to be deviated towards the corner which is positioned on the side opposite to the direction of protrusion of the flange with respect to the circumferential direction about axis O. When the bulge is formed, the bulge is positioned so as to be deviated towards the corner which is positioned on the side in the direction of protrusion of the flange with respect to the circumferential direction about axis O. By virtue of this, the above concave-convex independent mode can be purposely induced.

Figure 6A:
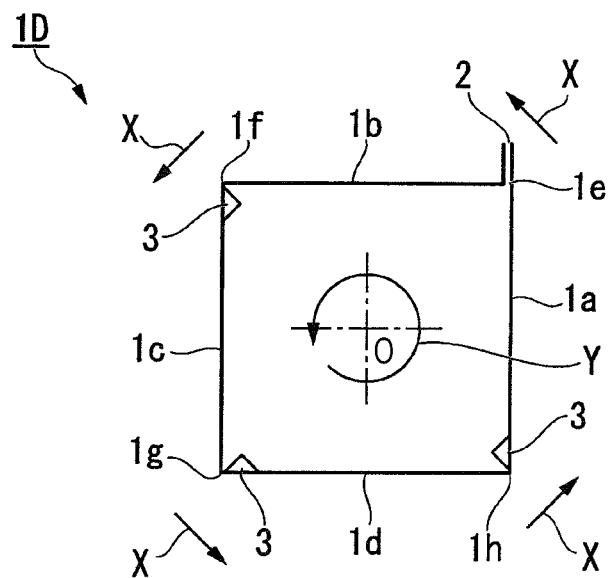
FIG. 6A is a schematic cross-sectional view for explaining the buckling of a shock absorbing member according to still another embodiment of the invention.

For example, FIG. 6A schematically shows a shock absorbing member 1D with a square cross-section, wherein a panel is constituted by walls 1*a*, 1*d*, 1*c* and 1*b*, and walls 1*a* and 1*b* are joined so that a flange 2 is formed so as to protrude from one corner 1*e*. In this case, on walls 1*a*, 1*c* and 1*d*, each wall being one of the neighboring walls sandwiching corners 1*h*, 1*f* and 1*g* different from corners 1*e* on which flange 2 is formed, dimples 3 denting from outer surfaces of walls 1*a*, 1*c* and 1*d* may be formed. Further, dimples 3 are positioned so as to be deviated, in relation to centers of walls 1*a*, 1*c* and 1*d*, respectively, towards corners 1*h*, 1*f* and 1*g* which are positioned on the side opposite to protruding direction X of flange 2 with respect to the circumferential direction about axis O.

In this case, by applying impact load to one end of shock absorbing member 1D in a direction of the axis (or the axial direction), the shock absorbing member begins to be buckled while a ridge of corner 1*e* is inclined in the same direction Y with respect to the circumferential direction about axis O, i.e., in the direction X towards wall 1*b*, wherein the open angle at the flange is smaller. Further, ridges of other corners 1*f*, 1*g* and 1*h* are inclined in the same direction Y with respect to the circumferential direction about axis O, i.e., towards the side where dimples 3 are formed (in the direction X). By virtue of this, the above concave-convex independent mode can be purposely induced.

Figure 6B:
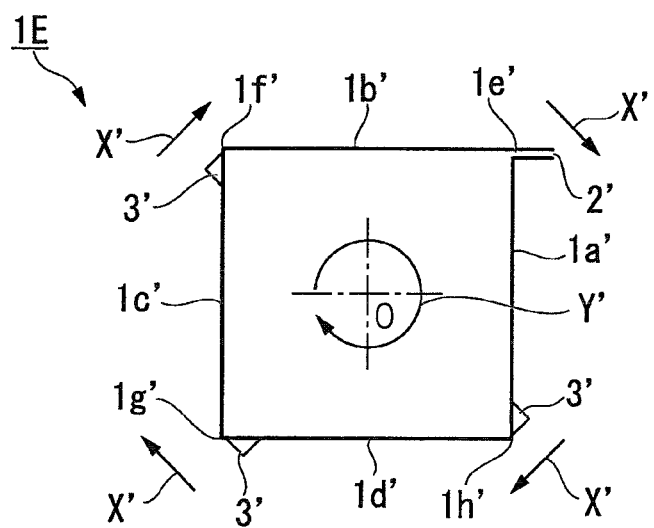
FIG. 6B is a schematic cross-sectional view for explaining the buckling of a shock absorbing member according to still another embodiment of the invention.

FIG. 6B schematically shows a shock absorbing member 1E with a square cross-section, wherein a panel is constituted by walls 1*a*', 1*d*', 1*c*' and 1*b*', and walls 1*a*' and 1*b*' are joined so that a flange 2' is formed so as to protrude from one corner 1*e*'. In this case, on walls 1*a*', 1*c*' and 1*d*', each wall being one of the neighboring walls sandwiching corners 1*h*', 1*f*' and 1*g*' different from corners 1*e*' on which flange 2' is formed, bulges 3' bulging from outer surfaces of walls 1*a*', 1*c*' and 1*d*' may be formed. Further, bulges 3' are positioned so as to be deviated, in relation to centers of walls 1*a*', 1*c*' and 1*d*', respectively, towards corners 1*h*', 1*f*' and 1*g*' which are positioned on the side in protruding direction X' of flange 2' with respect to the circumferential direction about axis O.

In this case, by applying impact load to one end of shock absorbing member 1E in a direction of the axis (or the axial direction), the shock absorbing member begins to be buckled while a ridge of corner 1*e*' is inclined in the same direction Y' with respect to the circumferential direction about axis O, i.e., in the direction X' towards walls 1*a*', wherein the open angle at the flange is smaller. Further, ridges of other corners 1*f*', 1*g*' and 1*h*' are inclined in the same direction Y' with respect to the circumferential direction about axis O, i.e., towards a side opposite to the side where bulges 3' are formed (in the direction X'). By virtue of this, the above concave-convex independent mode can be purposely induced.

As explained above, the flange and the bead of the invention function as a buckling inducing portion, capable of determining the direction of inclination, so that the ridge of each edge or corner is inclined in the same direction with respect to the circumferential direction about axis O at the beginning of the buckling, when the shock absorbing member is buckled in the direction of the axis. In addition, unlike the conventional bead having a function to provide the origin of the buckling to the shock absorbing member, the bead of the invention does not directly become the origin of the buckling. Rather, the bead of the invention has a function for rapidly making the transition to the concave-convex independent mode after the ridge of the corner is inclined (or after the buckling).

Therefore, the shock absorbing member according to the present invention can be effectively buckled in the axial direction thereof, by purposely inducing the above concave-convex independent mode. As a result, the amount of externally-applied impact energy absorption is increased, whereby remarkable shock-absorbing performance can be obtained.

When such a shock absorbing member is used in a chassis of a motorcar, etc., fuel efficiency and motion performance are improved while balancing reduced weight and high stiffness, and further, the chassis may have a structure with high collision-safety performance.

Although shock absorbing members 1A to 1E as shown in FIGS. 5A to 5C, 6A and 6B are exemplified, the shock absorbing member of the invention is not limited as such, and may have various configurations. In other words, the invention may be widely applied to a hollow columnar shock absorbing member with a polygonal cross-section, which absorbs externally-applied impact energy while buckling (or crushing) in the axial direction thereof.

Concretely, as the shock absorbing member, for example, a thin-walled structure having a flange, formed as a hollow column (or a hollow columnar member), constituted by joining a press-formed steel plates by welding, etc., may be used. In this case, the bead may be formed by press-forming, etc., before and/or after joining the hollow columnar member.

A material of the shock absorbing member is not limited to a steel plate as described above. For example, the material may be a metal such as iron, aluminum, copper or an alloy thereof; or a resin such as an FRP, as long as the member can absorb externally-applied impact energy while buckling (or crushing) in the axial direction thereof. Further, the shock absorbing member is not limited to a member formed by joining plates by welding, etc., and may be a hollow columnar member formed by extrusion molding, etc. In this case, the bead may be formed by press-forming, etc., after forming the hollow columnar member.

Figure 7A:
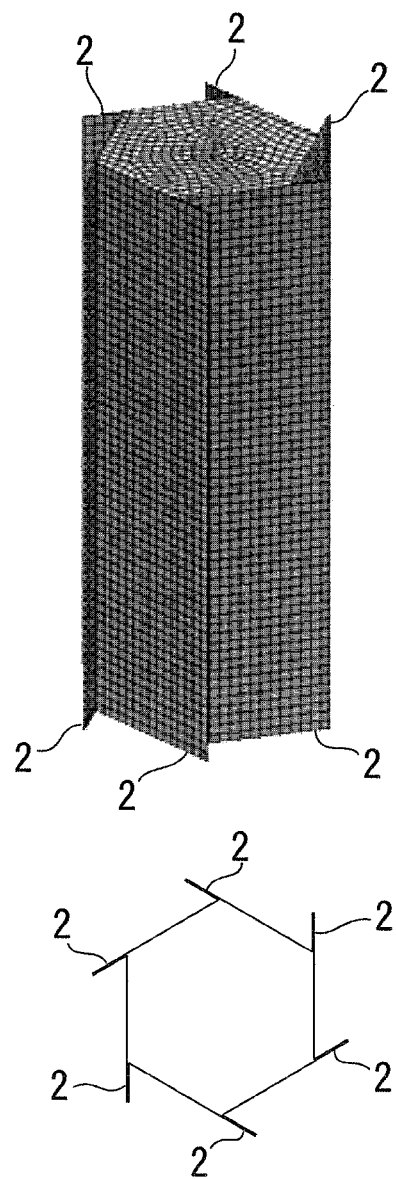
FIG. 7A is a perspective view of a shock absorbing member according to one embodiment of the invention.

In addition, it is preferable that the shock absorbing member have a hollow cross-section with a quadrangular, pentagonal, hexagonal, heptagonal or octagonal shape, for example, in order to balance reduced weight and high stiffness. In this case, as shown in FIGS. 7A to 7C, also in shock absorbing members each having a hexagonal cross-section, the concave-convex independent mode can be purposely induced by arranging flanges 2 so that directions of protrusion of the flanges are directed to the same direction with respect to the circumferential direction about axis O.

As shown in FIGS. 8A and 8B, dimples 3 may be aligned in the axial direction, from a start end of the buckling of the shock absorbing member. In this case, it is preferable that dimples 3 be positioned at an interval corresponding to a length of one side of the wall. Further, it is preferable that dimple 3 closest to the start end be positioned so as to be separated from the start end by a distance which is more than a half of the length of one side of the wall. By virtue of this, the shock absorbing member can be stably buckled into concertinas.

The shape of the bead is not limited the above dimple or bulge having a portion of a spherical surface, as long as the bead has a function of the invention. For example, the bead may have a V-shaped or U-shaped cross-section. Dimple 3 as shown in FIGS. 8A and 8B is configured as a concave portion with a trough shape extending in a direction (or a transverse direction) perpendicular to the axial direction of the shock absorbing member. In this case, the function of the bead of the invention may be further improved. Preferably, a length $L_1$ of trough-shaped dimple 3, in a direction perpendicular to axis O of the shock absorbing member, is represented as below, wherein "W" is a width of the wall (or a distance between the ridges of the shock absorbing member).

$$(1/10)W \leq L_1 \leq (3/4)W$$

Preferably, a length $L_2$ of trough-shaped dimple 3, in a direction of axis O of the shock absorbing member, is represented as below.

$$(1/20)L_1 \leq L_2 \leq L_1$$

Preferably, a distance $L_3$ between dimple 3 and the ridge is represented as below, wherein "T" is a thickness of the plate.

$$T \leq L_3 \leq (1/5)T$$

According to the invention, by arranging the bead on at least one of the walls of the shock absorbing member so that the bead is deviated towards one corner of the wall, the above concave-convex independent mode can be purposely induced. In other words, in the invention, the bead deviated towards one corner of at least one wall functions as the origin for determining the direction of the inclination of the ridge on the side towards which the bead is deviated. Similarly, the other ridges are induced to incline in the same direction as the ridge of the corner which becomes the origin.

However, in order for the corners to be stably inclined in the same direction, it is preferable that the bead be deviated towards the corner in two walls. More preferably, the bead is deviated towards the corner in all of the walls. A portion, to which the bead is provided, will become a valley (or a concave portion) of the concertinas after the buckling. Therefore, when the bead is arranged on all of the walls, a corner in the transverse cross-section, to which the bead is not provided, can be prevented from being a peak (or a convex portion) of the concertinas after the buckling. In addition, when the bead is positioned so as to be deviated towards the corner on the plurality of walls, it is preferable that the wall constituting an opposing corner of the cross-section of the polygonal shape is preferentially provided with the bead, in view of the balance of arrangement of the beads.

In the invention, "the bead is positioned so as to be deviated towards the corner" means that the bead is displaced towards the corner so that the center of the wall does not exist in the bead (i.e., the center is not deformed). Further, it is preferable that the beads be positioned in the vicinity of the corners which are located on the same sides with respect to the circumferential direction. In this regard, "in the vicinity of the corner" means the position near the corner so that the ridge of the corner does not exist in the bead (i.e., the corner is not deformed), and a distance between the center of the bead and the corner is equal to or smaller than a quarter of a width of the wall. In the invention, by positioning the bead in the vicinity of the corner, the ridge of the corner can be stably inclined.

On the other hand, when the bead is formed on the corner, the buckling is stably carried out, whereas the load supported by the corner is decreased. However, since the corner having the flange corresponds to a joint section between the neighboring walls sandwiching the corner, the corner has high deformation resistance and the load is not significantly decreased. Therefore, when buckling stability is required, the flange and the bead on the corner where the flange is formed, may be arranged. Further, the bead may be elongated between the flange and the wall.

In addition, in the invention, by conforming the direction of the deviation of the bead to a direction of a torsional load applied to the shock absorbing member, the impact absorbing performance of the shock absorbing member is also effective for the torsional load.

EXAMPLES

Hereinafter, the effect of the present invention will be more clearly explained. The invention is not limited to following examples, and numerous modifications could be made thereto, without departing from the basic concept and scope of the invention.

First, in relation to shock absorbing members of working examples 1 to 4 and a comparative example 1, deformation states thereof were calculated by FEM numerical analysis (computer simulation), when the impact load is applied to one end of the member in the axial direction of the member. As an analysis condition of the FEM numerical analysis, a linear hollow columnar member with a square cross-section, having a plate thickness of 1.4 mm, a side length of 50 mm and an axial length of 300 mm, was used as a model. Material constants of the model are indicated in table 1 as follows.

TABLE 1

|  | K [GPa] | $\epsilon_0$ | n | D [1/ms] | D [1/ms] |
|---|---|---|---|---|---|
| Base Material | 1.5 | 0.001 | 0.2 | $1.0 \times 10^{10}$ | 3.0 |

Then, the deformation state was calculated, when a rigid wall with a weight of 1000 kg fell at a rate of 4.44 m/s towards one end (or an upper end) of the hollow columnar member. In this regard, a constitutive equation used in the FEM numerical analysis was a Swift-Cowper-Symonds equation, as follows. In addition, an analysis time was 50 ms (milliseconds).

$$\sigma = K(\varepsilon_0 + \varepsilon^P)^n \left(1 + \left(\frac{\varepsilon^P}{D}\right)^{\frac{1}{Y}}\right)$$

Comparative Example 1

Figure 10:
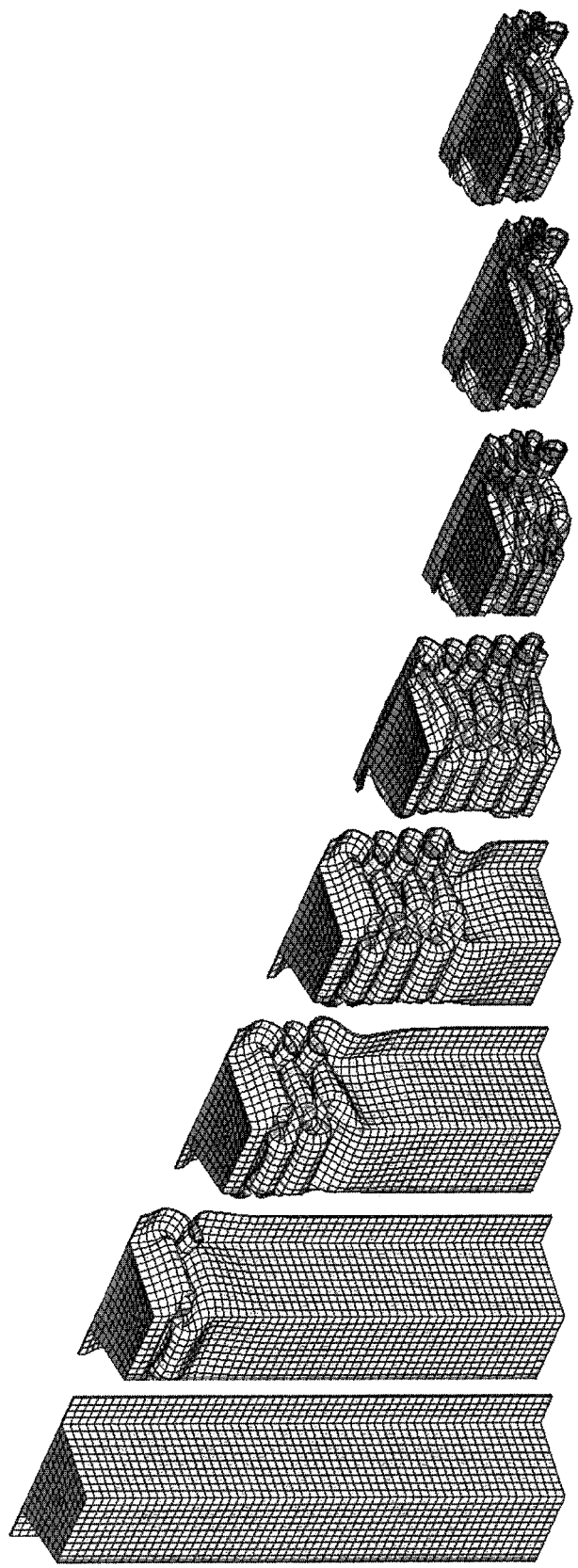
FIG. 10 is a perspective view of a shock absorbing member of comparative example 1, wherein deformation manner when impact load is applied to the shock absorbing member is calculated by FEM numerical analysis.

As shown in FIG. 9A, comparative example 1 was a hat-shaped hollow columnar member, wherein two flanges were directed to different directions with respect to the circumferential direction. Dimensions of the hat-shaped hollow columnar member are indicated in FIG. 9A. In this case, as shown in FIG. 10, the buckling of the member progressed in the concave-convex mixed mode from initial stage of the buckling.

Working Example 1

Figure 11:
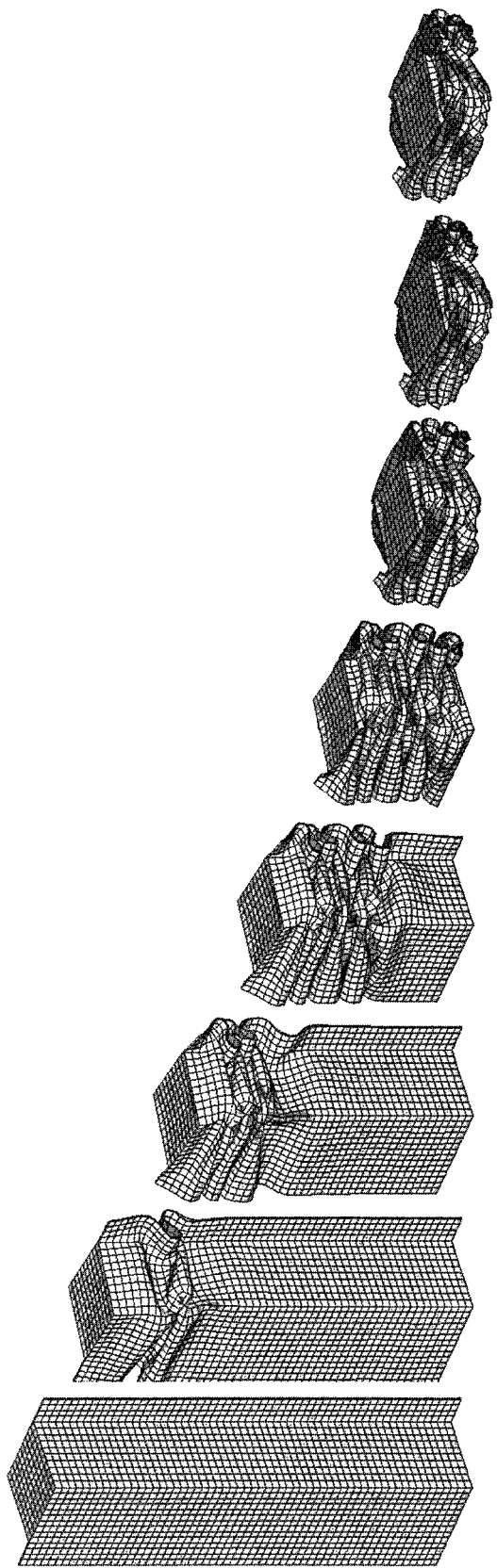
FIG. 11 is a perspective view of a shock absorbing member of working example 1, wherein deformation manner when impact load is applied to the shock absorbing member is calculated by FEM numerical analysis.

As shown in FIG. 9B, in working example 1, a flange was formed on each of two opposing corners of the hollow columnar member (a protruding length of each flange was 20 mm), so that the two flanges were directed in the same direction with respect to the circumferential direction. In this case, as shown in FIG. 11, the bucking of the member progressed in the concave-convex independent mode from initial stage of the buckling.

Working Example 2

Figure 12:
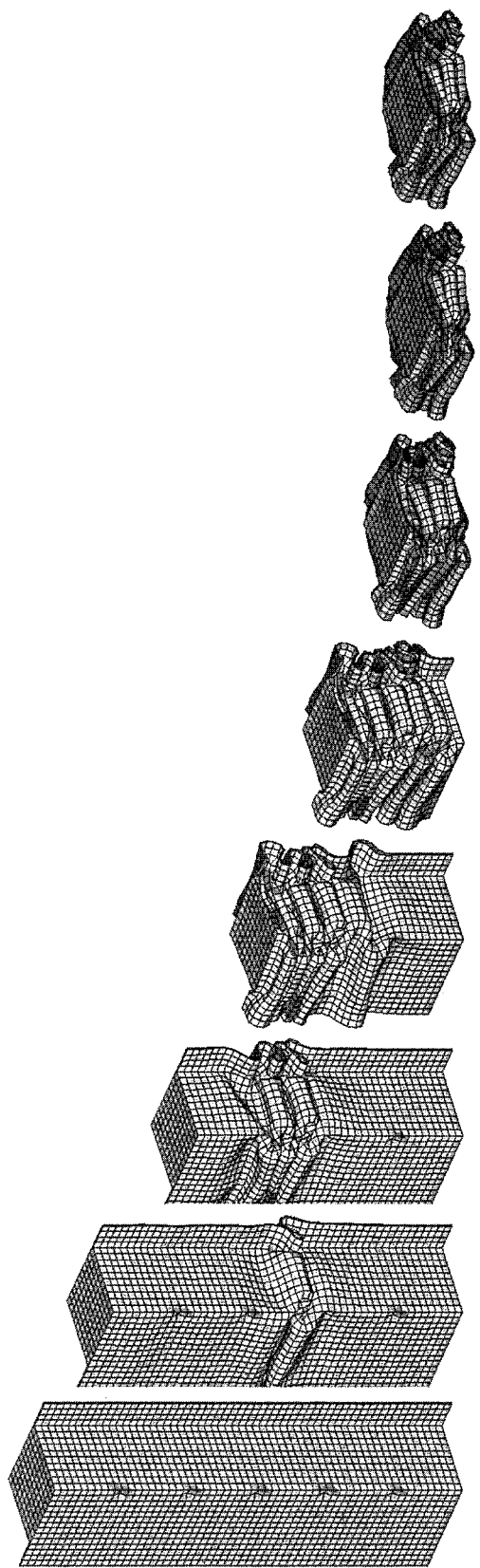
FIG. 12 is a perspective view of a shock absorbing member of working example 2, wherein deformation manner when impact load is applied to the shock absorbing member is calculated by FEM numerical analysis.

As shown in FIG. 9C, in working example 2, in addition to the configuration of working example 1, dimples were formed on one of the neighboring walls sandwiching the corner on which the flange was not formed. Each dimple dented from an outer surface of the shock absorbing member, and was positioned so as to be deviated towards the corner, relative to the center of the wall, which was positioned on the side opposite to the direction of protrusion of the flange with respect to the circumferential direction. In this case, as shown in FIG. 12, the bucking of the member progressed in the concave-convex independent mode from initial stage of the buckling.

Working Example 3

Figure 13:
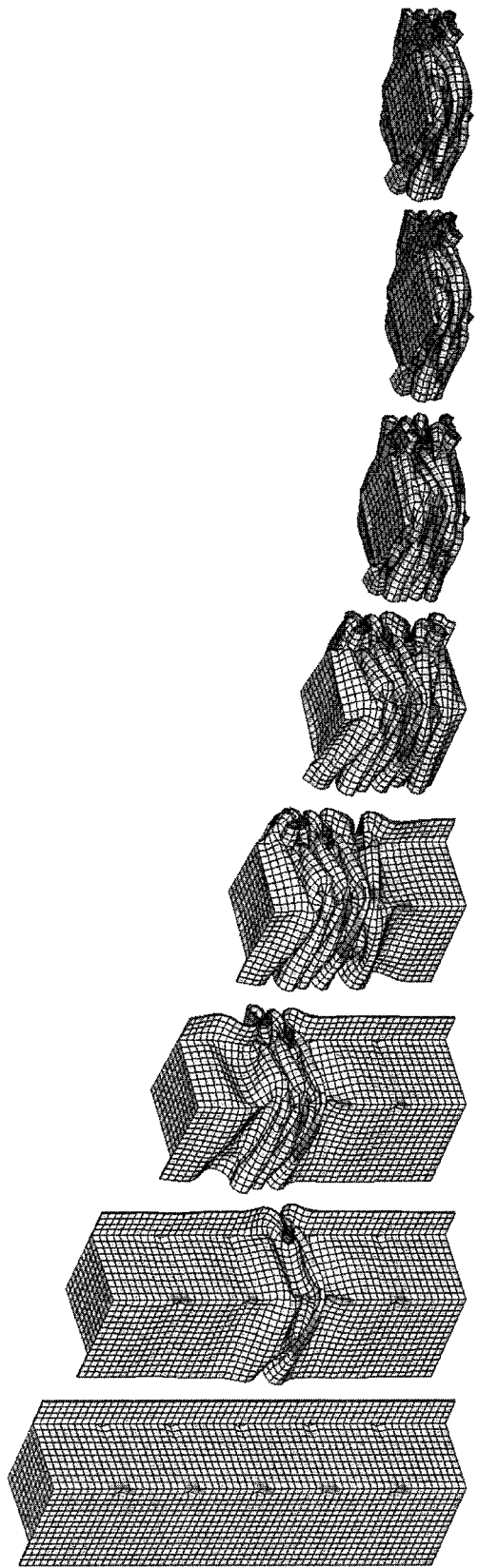
FIG. 13 is a perspective view of a shock absorbing member of working example 3, wherein deformation manner when impact load is applied to the shock absorbing member is calculated by FEM numerical analysis.

As shown in FIG. 9E, in working example 3, in addition to the configuration of working example 2, dimples were formed on one of the neighboring walls sandwiching the corner on which the flange was formed. Each dimple dented from an outer surface of the shock absorbing member, and was positioned so as to be deviated towards the corner, relative to the center of the wall, which was positioned on the side opposite to the direction of protrusion of the flange with respect to the circumferential direction. In this case, as shown in FIG. 13, the bucking of the member progressed in the concave-convex independent mode from initial stage of the buckling.

Working Example 4

Figure 14:
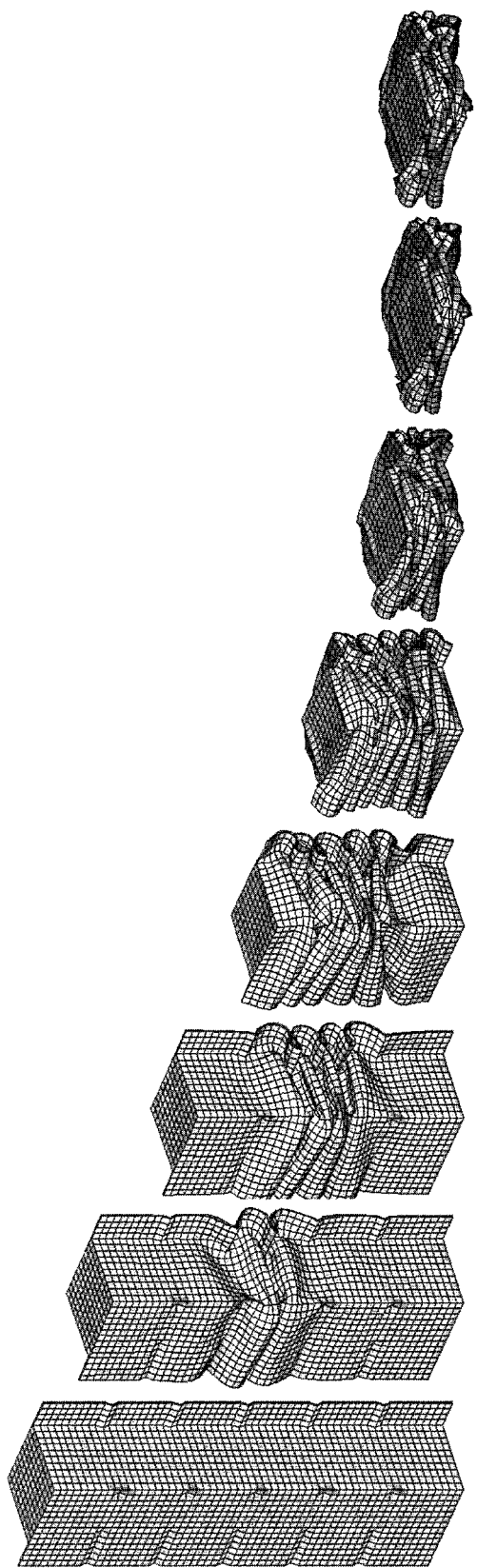
FIG. 14 is a perspective view of a shock absorbing member of working example 4, wherein deformation manner when impact load is applied to the shock absorbing member is calculated by FEM numerical analysis.
Figure 15A:
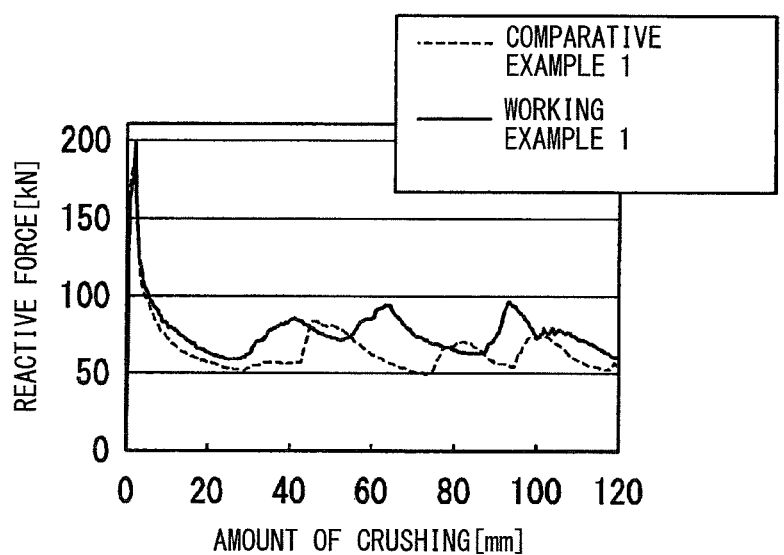
FIG. 15A is a graph showing a measurement of a relationship between a reactive force from the shock absorbing member and an amount of deformation (crushing) when impact load is applied to the shock absorbing member, in relation to working example 1 and comparative example 1.
Figure 15B:
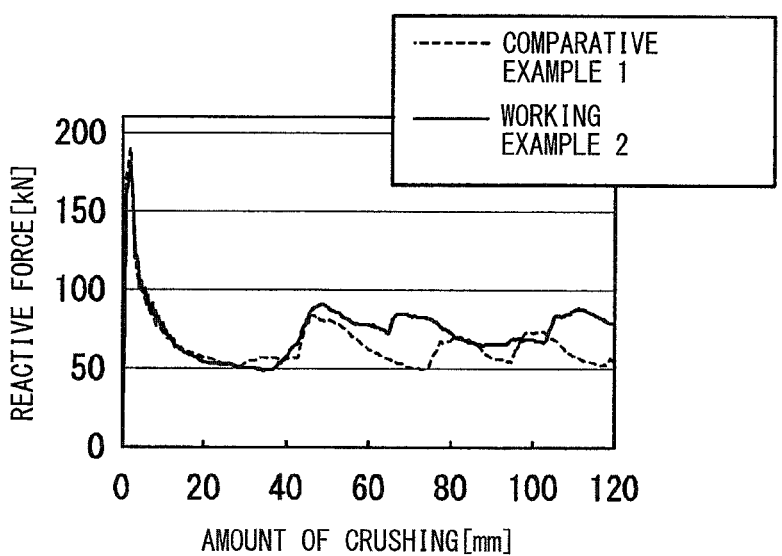
FIG. 15B is a graph showing a measurement of a relationship between a reactive force from the shock absorbing member and an amount of deformation (crushing) when impact load is applied to the shock absorbing member, in relation to working example 2 and comparative example 1.
Figure 15C:
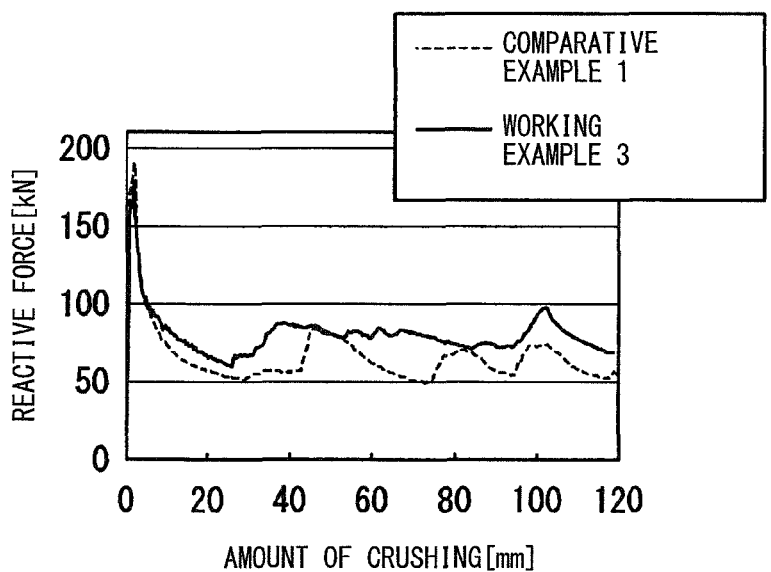
FIG. 15C is a graph showing a measurement of a relationship between a reactive force from the shock absorbing member and an amount of deformation (crushing) when impact load is applied to the shock absorbing member, in relation to working example 3 and comparative example 1.
Figure 15D:
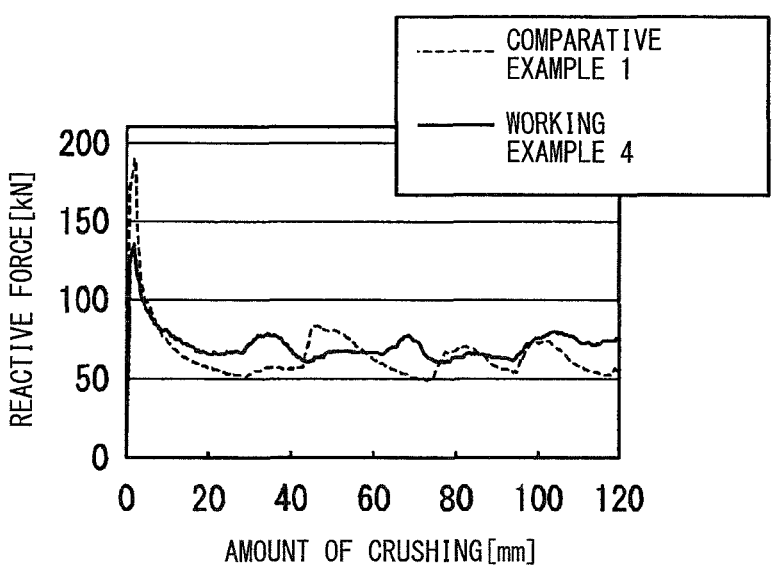
FIG. 15D is a graph showing a measurement of a relationship between a reactive force from the shock absorbing member and an amount of deformation (crushing) when impact load is applied to the shock absorbing member, in relation to working example 4 and comparative example 1.
Figure 16A:
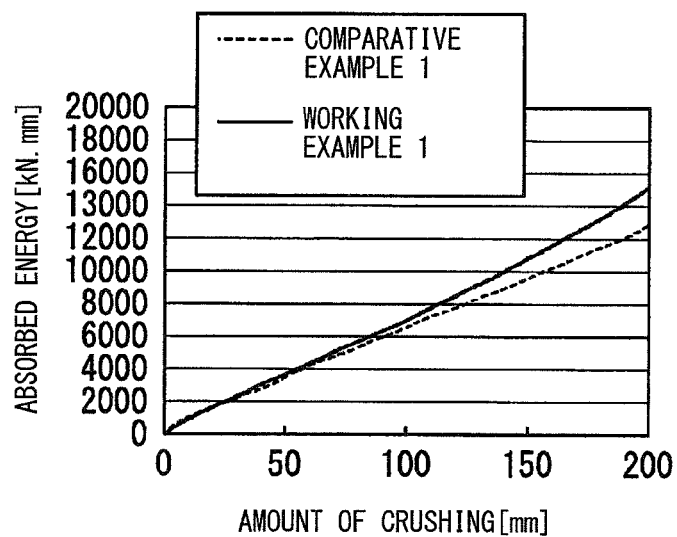
FIG. 16A is a graph showing a measurement of a relationship between an amount of energy absorption and an amount of deformation (crushing) when impact load is applied to the shock absorbing member, in relation to working example 1 and comparative example 1.
Figure 16B:
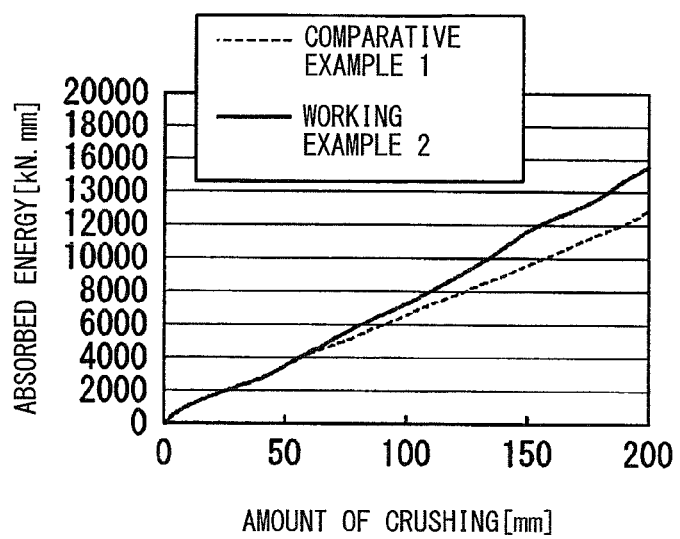
FIG. 16B is a graph showing a measurement of a relationship between an amount of energy absorption and an amount of deformation (crushing) when impact load is applied to the shock absorbing member, in relation to working example 2 and comparative example 1.
Figure 16C:
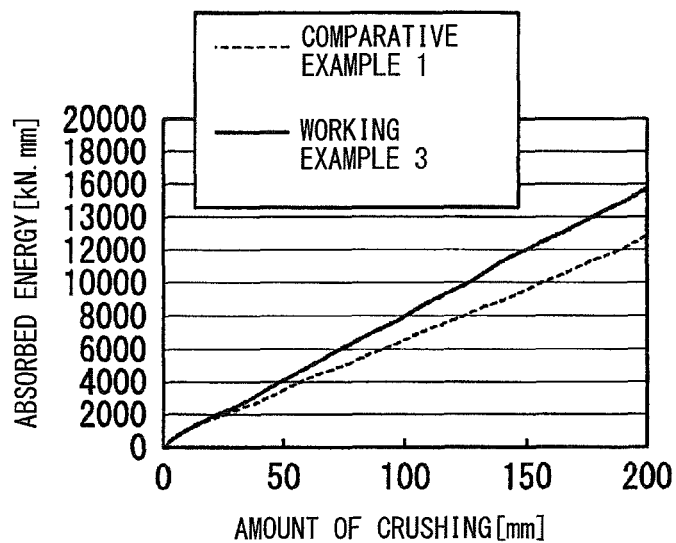
FIG. 16C is a graph showing a measurement of a relationship between an amount of energy absorption and an amount of deformation (crushing) when impact load is applied to the shock absorbing member, in relation to working example 3 and comparative example 1.
Figure 16D:
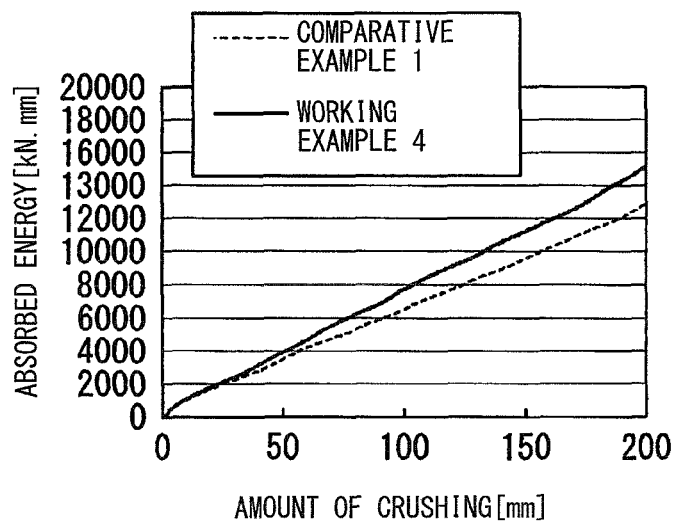
FIG. 16D is a graph showing a measurement of a relationship between an amount of energy absorption and an amount of deformation (crushing) when impact load is applied to the shock absorbing member, in relation to working example 4 and comparative example 1.

As shown in FIG. 9D, in working example 4, in addition to the configuration of working example 2, dimples were formed on the flanges. In this case, as shown in FIG. 14, the bucking of the member progressed in the concave-convex independent mode from initial stage of the buckling.

Next, FIGS. 15A to 15D indicate a result of measurement of the relationship between a reactive force from the shock absorbing member (or a resistive force of the member against the impact energy) and an amount of deformation (or an amount of crushing) when impact force was applied to one end of the member in the axial direction thereof, in relation to working examples 1 to 4 and comparative example 1. FIGS. 15A to 15D indicate the results of working examples 1 to 4, respectively, and each result is compared to a result of comparative example 1. In this regard, since a product of the reactive force from the shock absorbing member and the amount of crushing corresponds to an amount of energy absorption, the impact absorbing performance of the member is improved as the reactive force is increased.

Further, FIGS. 16A to 16D indicate a result of measurement of the relationship between the amount of deformation (or the amount of crushing) and an amount of energy absorption when impact force was applied to one end of the member in the axial direction thereof, in relation to working examples 1 to 4 and comparative example 1. FIGS. 16A to 16D indicate the results of working examples 1 to 4, respectively, and each result is compared to a result of comparative example 1.

As shown in FIGS. 15A to 15D and 16A to 16D, in the shock absorbing member of working examples 1 to 4, by inducing the concave-convex independent mode, a ratio of the amount of energy absorption relative to the amount of deformation (or crushing) was higher than comparative example 1 having the concave-convex mixed mode. In other words, the shock absorbing member of working examples 1 and 2 had improved shock absorbing performance.

REFERENCE SIGNS LIST 1A shock absorbing member
1B shock absorbing member
1C shock absorbing member
1D shock absorbing member
1E shock absorbing member
1$a$ wall
1$b$ wall
1$c$ wall
1$d$ wall
1$a$' wall
1$b$' wall
1$c$' wall
1$d$' wall
1$e$ corner
1$f$ corner
1$g$ corner
1$h$ corner
1$e$' corner
1$f$' corner
1$g$' corner
1$h$' corner
2$a$ flange
2$b$ flange
2$c$ flange
2$d$ flange
2$a$' flange
2$b$' flange
2$c$' flange
2$d$' flange
3 dimple
3'bulge

The invention claimed is:

1. A hollow columnar shock absorbing member having an axis, a plurality of rectangular walls extending parallel to the axis, and a polygonal cross-section perpendicular to the axis, the shock absorbing member extending in the direction of the axis and absorbing externally-applied impact energy while buckling in a direction of the axis,
   wherein the shock absorbing member is provided with at least two flanges protruding from at least two edges formed by at least two sets of neighboring walls among a plurality of walls, and the at least two flanges are arranged so that directions of protrusion of the flanges from the edges are directed to the same direction with respect to a circumferential direction, and
   wherein the flanges are rotationally symmetrical about a center point of the shock absorbing member.

2. The shock absorbing member according to claim 1, wherein a bead is formed on at least one of the walls, the bead being a dimple which dents from an outer surface of the shock absorbing member or a bulge which bulges from the outer surface, and wherein the dimple is positioned so as to be deviated towards the edge positioned on a side opposite to the direction of protrusion of the flange with respect to the circumferential direction, and the bulge is positioned so as to be deviated towards the edge positioned on a side in the direction of protrusion of the flange with respect to the circumferential direction.

3. The shock absorbing member according to claim 2, wherein the bead is positioned in the vicinity of the edge positioned on the side opposite to the direction of protrusion of the flange.

4. The shock absorbing member according to claim 2, wherein the bead is a dimple formed into a trough shape extending in a direction perpendicular to the direction of the axis.

5. The shock absorbing member according to claim 2, wherein the beads are aligned in the direction of the axis from an end of the shock absorbing member where the buckling is initiated.

6. The shock absorbing member according to claim 3, wherein the bead is a dimple formed into a trough shape extending in a direction perpendicular to the direction of the axis.

7. The shock absorbing member according to claim 3, wherein the beads are aligned in the direction of the axis from an end of the shock absorbing member where the buckling is initiated.

8. The shock absorbing member according to claim 4, wherein the beads are aligned in the direction of the axis from an end of the shock absorbing member where the buckling is initiated.

9. The shock absorbing member according to claim 7, wherein the beads are aligned in the direction of the axis from an end of the shock absorbing member where the buckling is initiated.

10. A hollow columnar shock absorbing member having an axis and a polygonal cross-section, the shock absorbing member absorbing externally-applied impact energy while buckling in a direction of the axis,
    wherein a buckling inducing portion for determining a direction of inclination is formed on a wall and an edge of the shock absorbing member, so that a ridge of each edge is inclined in the same direction with respect to a circumferential direction of the shock absorbing member at the beginning of the buckling, when the shock absorbing member is buckled in the direction of the axis,
    wherein the buckling inducing portion has a flange formed so as to protrude from one corner, and, on one of the neighboring walls having a corner being different from the corner on which the flange is formed, a dimple recessed from an outer surface of the wall or a bulge protruding from the outer surface of the wall,
    wherein the dimple is positioned in a manner biased to a corner which is positioned on the side opposite to the protruding direction of the flange in the circumferential direction centered at the axis with respect to a central portion of the wall on which the dimple is positioned, and
    wherein the bulge is positioned in a manner biased to a corner which is positioned on the side in the protruding direction of the flange in the circumferential direction centered at the axis with respect to the central portion of the wall on which the bulge is positioned.

* * * * *